US012610101B2

(12) United States Patent
Rivoalen et al.

(10) Patent No.: US 12,610,101 B2
(45) Date of Patent: Apr. 21, 2026

(54) METHOD FOR GENERATING A VIRTUAL TV CHANNEL FOR A USER OF AT LEAST ONE AUDIOVISUAL CONTENT BROADCAST SERVICE, CORRESPONDING GENERATION DEVICE, SERVICE EQUIPMENT AND COMPUTER PROGRAM

(71) Applicant: Orange, Issy-les-Moulineaux (FR)

(72) Inventors: Mathieu Rivoalen, Chatillon (FR); Hervé Marchand, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 55 days.

(21) Appl. No.: 18/192,203

(22) Filed: Mar. 29, 2023

(65) Prior Publication Data

US 2023/0319333 A1 Oct. 5, 2023

(30) Foreign Application Priority Data

Mar. 30, 2022 (FR) ...................................... 2202875

(51) Int. Cl.
*H04N 21/2668* (2011.01)
*H04N 21/239* (2011.01)
*H04N 21/258* (2011.01)

(52) U.S. Cl.
CPC ..... *H04N 21/2668* (2013.01); *H04N 21/2393* (2013.01); *H04N 21/25891* (2013.01)

(58) Field of Classification Search
None
See application file for complete search history.

(56) References Cited

U.S. PATENT DOCUMENTS 8,826,351 B2 * 9/2014 Li ............................ H04N 5/76
725/38
10,779,042 B1 9/2020 Gupta et al.
(Continued)

FOREIGN PATENT DOCUMENTS

FR 3 006 540 A1 12/2014

OTHER PUBLICATIONS

French Search Report for French Application No. 2202875 dated Nov. 4, 2022.
(Continued)

*Primary Examiner* — Jason K Lin
(74) *Attorney, Agent, or Firm* — Knobbe, Martens, Olson & Bear, LLP

(57) ABSTRACT

A method for generating a virtual TV channel for a user of a terminal configured to access at least one audiovisual content broadcast service, having audiovisual contents including audiovisual contents being broadcast. The method includes: selecting, amongst audiovisual contents being broadcast accessible from the terminal by the at least one service, an audiovisual content being broadcast, according to at least one selection criterion and descriptive information associated to the audiovisual contents being broadcast; when no audiovisual content being broadcast is selected, selecting, amongst other audiovisual contents accessible from the terminal by the service, other audiovisual content, according to the selection criterion and descriptive information associated to the audiovisual contents; upon reception of a request for accessing the virtual TV channel originating from the terminal, transmitting, for rendering: (i) the audiovisual content being broadcast, when an audiovisual content being broadcast has been selected; and (ii) the other audiovisual content, otherwise.

14 Claims, 4 Drawing Sheets

(56)         References Cited

U.S. PATENT DOCUMENTS

| 11,317,155 | B1 * | 4/2022 | Brasch | ............... | H04N 21/6587 |
| 2003/0097657 | A1 | 5/2003 | Zhou et al. | | |
| 2023/0247245 | A1 * | 8/2023 | Fanfani | ............. | H04N 21/4532 |
| | | | | | 725/34 |

OTHER PUBLICATIONS

French Written Opinion for French Application No. 2202875 dated Nov. 18, 2022.

* cited by examiner

METHOD FOR GENERATING A VIRTUAL TV CHANNEL FOR A USER OF AT LEAST ONE AUDIOVISUAL CONTENT BROADCAST SERVICE, CORRESPONDING GENERATION DEVICE, SERVICE EQUIPMENT AND COMPUTER PROGRAM

INCORPORATION BY REFERENCE TO ANY PRIORITY APPLICATIONS

This application claims foreign priority to French Patent Application No. FR 2202875, entitled "METHOD FOR GENERATING A VIRTUAL TV CHANNEL FOR A USER OF AT LEAST ONE AUDIOVISUAL CONTENT BROADCAST SERVICE, CORRESPONDING GENERATION DEVICE, SERVICE EQUIPMENT AND COMPUTER PROGRAM" and filed Mar. 30, 2022, the content of which is incorporated by reference herein in its entirety.

BACKGROUND

Field

The present development relates to telecommunications in general, and more specifically to access to audiovisual contents. More particularly, it applies to user terminals and/or to service pieces of equipment handling such contents.

Description of the Related Art

Nowadays, a user has access to a rich and diversified offer of audiovisual content broadcast services. Through a broadcast piece of equipment, like for example, IP TV ("Internet Protocol Television"), the user can access many multimedia contents: broadcast at the time slots indicated in a TV program schedule (for example retransmissions of events that have taken place in live (or "Live"), or more generally, contents scheduled by a TV channel), in rebroadcast ("replay"), recorded, on demand ("VOD" or "SVOD" standing for "Video On Demand" and "Subscription Video On Demand").

Public or private TV channels accessible through Digital Terrestrial Television, or DTTV, cable TV or by satellite, conventionally propose audiovisual programs, broadcast thereby according to a TV program schedule. These audiovisual programs could benefit during broadcast thereof from a start over function ("Start Over"). Thus, when the user switches on an audiovisual program being broadcast, he then has the possibility to go back and start viewing the program from the beginning.

Complementarily, many TV channels nowadays provide the user with an audiovisual program rebroadcast service (or "replay") for a given period of time, for example one month after the broadcast date of this program scheduled in the TV program schedule. In this manner, the user can still access in continuous download mode (or "streaming") an audiovisual content the broadcast of which he has missed, at the time where he wishes so during this given period of time.

Some of these channels are so-called generalist, because they propose diversified programs, intended to all types of publics and adapted according to the time slot and the type of audience that is most represented on this time slot. Others are so-called thematic, since they specialize in a particular theme, like sports, travels, culture, news, young audience, etc.

For some years now, there have also been audiovisual content broadcast platform that provides their subscribed users with a wide range of audiovisual contents, such as series, films or documentaries, available on demand.

It should be understood that, nowadays, the user is provided with an almost overabundant audiovisual content offer. This wide variety is interesting, but poses problems relates to searching and browsing to select, according to his current inclinations and desires, the best audiovisual content available at a given time point.

Indeed, at the time being, these audiovisual contents are accessible on an individual fashion, i.e. access to the audiovisual contents is still controlled by the user who should explicitly select a content. In other words, when the user wishes to access a multimedia content, he should browse the different audiovisual contents (for example through a TV channel mosaic, or in a video-on-demand catalog) to display an audiovisual content of his choice, or select a video-on-demand to view it. This audiovisual content selection is done essentially through a consultation by the user of descriptive information, or metadata, associated to the content itself (for example: title, description, category, content type such as live or VOD, duration, video quality . . . ).

Furthermore, a TV channel suggested by a service operator, whether thematic or generalist, never corresponds exactly to the expectations of a particular user.

Hence, there is a need for a solution to assist the user in easily selecting the best content available at a given time point. The development is intended to improve the situation.

SUMMARY

The development addresses this need by providing a method for generating a TV channel accessible from a terminal configured to access at least one audiovisual content broadcast service, said audiovisual contents possibly being audiovisual contents including contents being broadcast.

Such a method comprises:

selecting an audiovisual content according to at least one selection criterion and descriptive information associated to said audiovisual contents; the selected audiovisual content being primarily a content being broadcast;

adding the selected content to the TV channel.

More specifically, the development consists, when no audiovisual content being broadcast is selected, in:

selecting, amongst a plurality of audiovisual contents, and accessible from the terminal of the user by said at least one service, at least one other audiovisual content, according to said at least one selection criterion and descriptive information associated to said audiovisual contents;

upon reception of a request for accessing said virtual TV channel originating from said terminal of the user, transmitting, for rendering thereof by said terminal of said user as a program of said virtual channel:
    (i) said selected audiovisual content, if it is being broadcast; and
    (ii) said at least one other audiovisual content, otherwise.

The development provides a quite novel and inventive approach for managing access to audiovisual contents available for a user of one or more audiovisual content broadcast service(s). Indeed, it proposes building a virtual TV channel for the user according to one or more audiovisual content selection criterion/criteria.

By "multimedia content", or "audiovisual content", it should be understood a digital content that contains at least one picture, a text or audio data. The multimedia content may be received in broadcast (streaming, TV, radio channel, etc.) or recorded on a medium (hard disk, database, server, etc.).

More specifically, the development consists in selecting amongst audiovisual contents of different nature, and accessible to the user, the audiovisual content that is the most likely to interest the user and in broadcasting it in the virtual channel. For this purpose, building this virtual channel is done on demand, i.e. when the user actually requests access to this channel, based on one or more selection criterion/criteria and on the analysis of the descriptive information (or metadata) of the accessible audiovisual contents. In other words, these selection criteria allow sorting out among the audiovisual contents accessible to the user, on the basis of the descriptive information of these audiovisual contents, in order to select those that are most likely to interest the user.

Thus, when the user requests viewing this virtual channel, for example by pressing a dedicated button of his remote-control or by clicking on an icon of this channel, the user terminal receives the selected audiovisual content for rendering thereof on a screen of the terminal of the user, like a program of the virtual TV channel.

In this manner, the user does not have to browse the entirety of the available audiovisual offer, in particular he has not to switch on all TV channels, to select the audiovisual content that pleases him the most. On the contrary, the virtual channel suggests to him an audiovisual content that selected to please him or at least likely to have a particular interest for him, to which he accesses effortlessly.

Furthermore, the selection of an audiovisual content is primarily done amongst audiovisual contents the broadcast of which, for example scheduled over the current time slot of a TV program schedule of a TV channel, is ongoing (For example "live" type contents, i.e. whose action takes place at the same time as the retransmission to the user, or contents scheduled by a TV channel and being broadcast when the user requests accessing his virtual channel). Advantageously, this allows immediately suggesting to the user audiovisual contents that might interest him and which are being broadcast, at the time of his request for accessing the virtual channel, but which will probably not be accessible afterwards. In the case where no content being broadcast could be selected (because none meets the selection criterion/criteria), the development suggests falling back on other types of accessible audiovisual contents that meet the selection criterion/criteria. Thanks to this "reserve" of audiovisual contents, the development guarantees that there is always an available audiovisual content that meets the selection criterion/criteria and therefore that the virtual channel is continuously fed in.

According to one feature of the development, the method further comprises recording the selected audiovisual content being broadcast, called pre-recorded broadcast audiovisual content, in a memory and in that said at least one other plurality of audiovisual contents comprises the pre-recorded broadcast audiovisual content.

Advantageously, when an audiovisual content being broadcast in live is selected because it meets the selection criterion/criteria, it is recorded in order to feed in a "reserve" of recorded broadcast audiovisual contents that will be used to continuously feed in the virtual channel so the user never runs out of contents to view. In particular, recording the audiovisual contents the broadcast of which is scheduled enables the user to view audiovisual contents scheduled on time slots that are inadequate for the user (for example at 1.00 AM, or during the work hours of the user) or when several audiovisual contents being broadcast meeting the selection criterion/criteria are simultaneously broadcast on two distinct program channels.

According to another feature of the development, the method further comprises obtaining at least one preference criterion of the user, and said at least one selection criterion comprises said at least one preference criterion of said user.

Advantageously, according to an embodiment of the development, the selection criterion used to implement the selection of the audiovisual content being broadcast or another audiovisual content where appropriate, corresponds to preference criteria of the user.

By "preference criterion", it should be understood a characteristic or a set of characteristics related to an audiovisual content and which define a preference or an inclination of the user for this audiovisual content. For example, it consists of a theme, such as sports, travels, cinema, etc., a film genre, like comedy, thriller, etc., a violence or action level according to the time of the day or the day of the week, of an actor present in the film, etc.

Thus, the user can define a theme that is specific to him, like for example "automobile Europe" or "sports excluding football" or broaden the definition of a theme suggested by a theme channel, like "sea bed exploration and travel".

According to another feature of the development, the method comprises determining at least one so-called recurrent theme, based on descriptive information of audiovisual contents scheduled in at least one TV program schedule over a given period of time and on a predetermined occurrence criterion and said at least one selection criterion comprises said recurrent theme.

In another embodiment of the development, the selection criterion on which the selection of the audiovisual content is based corresponds to one or more so-called recurrent theme(s). In other words, the selection is based on the prior identification of recurrent themes over a definite period of time.

By "recurrent theme", it should be understood a theme, generally still current, which is the subject of a large media coverage over a given period of time, which is reflected by scheduling of several audiovisual contents covering the same theme in the TV program schedules accessible for the user. This recurrent theme may relate to a punctual media event, such as a sports event (for example the "Olympic Games", the "World Football Cup"), political event (for example the "presidential election"), cultural event (for example "Cannes Festival", "Rio Carnival", etc.) event, a commemoration, etc. This event is limited over time.

Thus, it is possible to create virtual channels defined according to some themes that are found on a regular basis in the audiovisual contents of a future TV program schedule. Advantageously, the identification of a recurrent theme is done by analysis of the descriptive information of future audiovisual contents, in one or more TV program schedules associated to a future period of time, for example by extraction of key words.

An occurrence criterion is then predetermined to allow establishing the point at which a theme becomes recurrent, and the point at which this theme is no longer relevant. Advantageously, this predetermined occurrence criterion is an integer comprised between 0 and N, corresponding to a number of times the theme is found after analysis of the descriptive information. For example, a given number of times where key words appear in the descriptive information of the audiovisual contents scheduled in TV program schedules. Thus, it is considered that starting from a given apparition threshold of the theme (for example identification of the number of apparition of key words) in the descriptive information of the audiovisual contents, then the theme returns on a regular basis and is therefore identified as recurrent. If, on the contrary, below this apparition threshold of the theme, it is then considered that the theme is not recurrent or is no longer recurrent because it tends to disappear from the descriptive information.

It is then possible to propose particular themes to the user based on these punctual media events, and to put forth theme virtual channels proposing audiovisual contents centered on only one theme. Hence, the user can access a mosaic of virtual channels that are dynamically built according to the themes covered in future TV program schedules. Thus, it is possible to build several virtual channels, each based on a recurrent theme.

Advantageously, these virtual channels based on identified recurrent themes are ephemeral, i.e. their lifespan is limited over time.

This time limit corresponds to the period of time over which the theme could be identified based on the descriptive information of the audiovisual contents, i.e. the period of time during which the punctual media event takes place. This period of time may range from a few weeks to a few months depending on the media event type. In other words, once the punctual media event is completed, the identified theme tends to disappear from the descriptive information of the audiovisual contents and therefore the virtual channel is no longer fed in with audiovisual contents and therefore is no longer relevant.

Thus, it is possible to suggest to the user virtual channels that evolve over time.

Alternatively, the selection criterion may be based both on the preference criteria of the user and on recurrent themes.

According to a particular aspect of the development, said at least one other plurality of audiovisual contents amongst which said selection of said at least one other audiovisual content is implemented further comprises:

audiovisual contents available in rebroadcast, if no audiovisual content being broadcast and no pre-recorded broadcast audiovisual content could be selected;

audiovisual contents accessible on demand, if no audiovisual content available in rebroadcast could be selected.

One advantage is to exploit any diversity of the audiovisual offer available for the user via the different broadcast services to which he has access. The virtual channel is then always fed in with audiovisual contents.

Advantageously, distinct priority levels are associated to the different types of audiovisual contents forming this other plurality of available audiovisual contents. For example, when no audiovisual content being broadcast could be selected, then the selection is done amongst the pre-recorded broadcast audiovisual contents. Nonetheless, if no audiovisual content being broadcast and recorded could be selected, then the selection is done amongst the available contents, in rebroadcast. If none of the previous audiovisual contents could be selected, then the selection is implemented amongst the audiovisual contents available on demand. In other words, the audiovisual contents amongst which the selection is implemented are hierarchized according to different selection priorities.

According to another particular aspect of the development, the pre-recorded broadcast audiovisual content is deleted from said memory when at least one delete condition is met, said at least one delete condition belonging to a group comprising:

a period of time has elapsed;

a storage capacity of the memory is reached;

the pre-recorded broadcast audiovisual content has been rendered by the terminal of the user as a program of said virtual TV channel.

Advantageously, it is possible to optimize the storage space of the memory on which the audiovisual contents are recorded, in order to allow continuously feeding in the virtual channel, and at the same time avoiding keeping the audiovisual content that is too old or already viewed by the user.

The development also relates to a device for generating a TV channel (100) accessible from a terminal configured to access at least one audiovisual content broadcast service, said audiovisual contents possibly being audiovisual contents including contents being broadcast.

This is configured to:

select an audiovisual content according to at least one selection criterion and descriptive information associated to said audiovisual contents; the selected audiovisual content being primarily a content being broadcast;

add the selected content to said TV channel.

Advantageously, the device is further configured, when no audiovisual content being broadcasted is selected, to:

select, amongst at least one other plurality of audiovisual contents, and accessible from the terminal of the user by said at least one service, at least one other audiovisual content, according to said at least one selection criterion and descriptive information associated to said audiovisual contents;

upon reception of a request for accessing said virtual TV channel originating from said terminal of the user, to transmit for rendering thereof by said terminal of said user as a program of said virtual channel:

(i) said selected audiovisual content, if it is being broadcast; and (ii) said at least one other audiovisual content, otherwise.

Advantageously, the device is further configured to record the selected audiovisual content being broadcast, called pre-recorded broadcast audiovisual content, in a memory and in that said at least one other plurality of audiovisual contents comprises the pre-recorded broadcast audiovisual content.

Advantageously, the device is configured to obtain at least one preference criterion of said user, and said at least one selection criterion comprises said at least one preference criterion of said user.

Advantageously, the device is configured to determine at least one so-called recurrent theme, based on descriptive information of audiovisual contents scheduled in at least one TV program schedule over a given period of time and on a predetermined occurrence criterion and said at least one selection criterion comprises said recurrent theme.

The development also relates to a service piece of equipment involved in the implementation of at least one service for broadcasting audiovisual contents to a user. This service piece of equipment comprises a device for generating a virtual TV channel for said user as described before.

The development also relates to a computer program product comprising program code instructions for the implementation of a method as described before, when it is executed by a processor.

The development also relates to a computer-readable storage medium on which a computer program is stored comprising program code instructions for the execution of the steps of the method for generating a virtual TV channel according to the development as described hereinabove.

Such a storage medium may be any entity or device capable of storing the program. For example, the medium may include a storage means, such as a ROM, for example a CD-ROM or a ROM of a microelectronics circuit, or a magnetic storage means, for example a mobile medium (memory card) or a hard disk or a SSD.

Besides, such a storage medium may be a transmissible medium such as an electrical or optical signal, by radio waves or by other means, so that the computer program contained therein is remotely executable. In particular, the program according to the development may be downloaded on a network for example the Internet network.

Alternatively, the storage medium may be an integrated circuit in which the programs are embedded, the circuit being adapted to execute or to be used in the execution of the aforementioned method.

According to one embodiment, the present technique is implemented by means of software and/or hardware components. With this in mind, the term "module" may correspond to a software component as well as to a hardware component or a set of hardware and software components, a software component corresponding itself to one or more computer program(s) or subprogram(s) or more generally to any element of a program able to implement a function or a set of functions.

A software component corresponds to one or more computer program(s), one or more subprogram(s) of a program, or more generally to any element of a program or of a software able to implement a function or a set of functions, according to what is described hereinbelow for the considered module. Such a software component is executed by a data processor of a hardware entity (terminal, server, gateway, set-top-box, router, etc.) and is likely to access the hardware resources of this hardware entity (memories, storage media, communication buses, input/output electronic boards, user interfaces, etc.). Next, by resources, it should be understood all sets of hardware and/or software elements supporting a function or a service, whether these are unitary or combined.

In the same manner, a hardware component corresponds to any element of a hardware set (or hardware) able to implement a function or a set of functions, according to what is described hereinbelow for the considered module. It may consist of a hardware component that is programmable or with an integrated processor for software execution, for example an integrated circuit, a chip card, a memory card, an electronic card for the execution of a firmware, etc.

Of course, each component of the previously-described system implements its own software modules.

The different above-mentioned embodiments can be combined together for the implementation of the present technique.

BRIEF DESCRIPTION OF THE DRAWINGS

Other aims, features and advantages of the development will appear more clearly upon reading the following description, given just as an illustrative non-limiting example, with reference to the figures, among which.

DETAILED DESCRIPTION

The principle of the development is based on the generation of a virtual TV channel for a user of one or more audiovisual content broadcast service(s) based on one or more selection criterion/criteria of these available audiovisual contents, and on the provision of this virtual channel to the user.

More specifically, upon reception of a request for accessing the virtual TV channel originating from the user, a selection of an audiovisual content is implemented for the generation of this virtual channel. This selection is based on one or more selection criterion/criteria allowing sorting out among audiovisual contents of different natures available for this user, using the descriptive information (or metadata) of these audiovisual contents.

The selected audiovisual content is then transmitted to the terminal of the user for rendering to the user on a display device, as if it were a program of this customized channel.

Hence, the development suggests providing the user with a virtual TV channel specifically built for this user, and generated from a selection among all audiovisual contents accessible to the user.

The development applies to any type of audiovisual content provision or broadcast service implemented in any type of telecommunications network, to a user of a terminal piece of equipment connected to this network and configured to access this service.

The development applies quite particularly to audiovisual content broadcast service(s) implemented by the same service operator. In this case, indeed, the problems relating to rights of the user to access either audiovisual content are managed in a centralized manner by the operator.

Nevertheless, it also applies when the user has subscribed to several audiovisual content broadcast services before different operators and to an Internet access service that provides him with an interface for managing, for each broadcast service, his rights to access this service. In this manner, the development can generate a virtual TV channel for the user from audiovisual contents derived from these different broadcast services.

Figure 1:
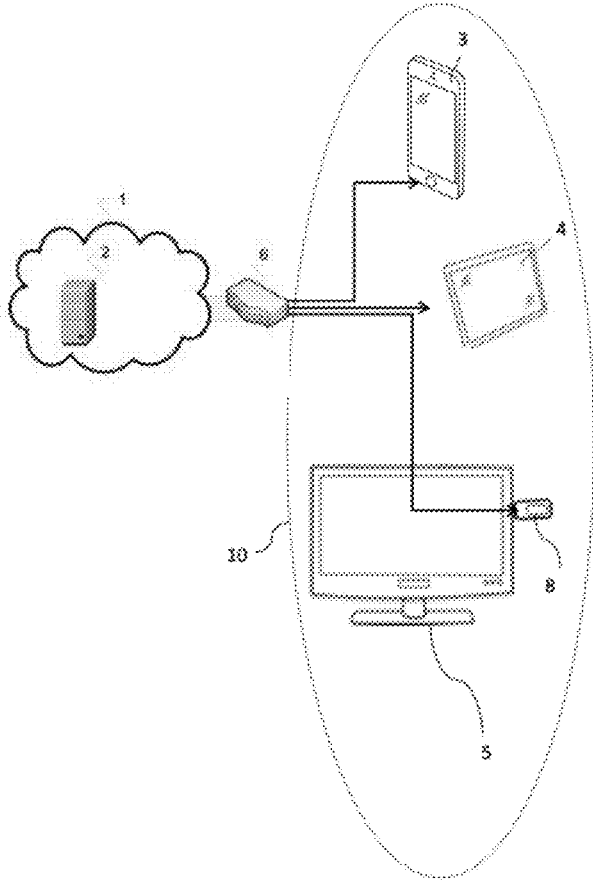
FIG. 1 schematically illustrates an example of a context of implementation of the development.

FIG. 1 represents the general context of an embodiment of the development, wherein a telecommunication system includes a first local area network or LAN (Local Area Network, 10) and a wide area type network, or WAN (Wide Area Network, 1). According to this non-limiting example, the LAN network is a domestic network and the WAN network is an Internet network. More generally, the LAN network 10 may be an enterprise network and the WAN network 1 could be of any type (cellular, GSM—Global System for Communication Mobile, UMTS—Universal Mobile Telecommunications System, Wifi—Wireless, DVB—Digital Video Broadcast, etc.) without departing from the scope of the development.

The terminal 3, for example a smartphone, the terminal 4, for example a laptop, and the terminal 5, for example a TV set connected to a HDMI key 8, are located in the local area network (LAN, 10) controlled by a domestic gateway 6. The context of the local area network is given as example and could be easily transposed to a "best effort" type Internet network, an enterprise network, etc.

A service piece of equipment 2, involved in the implementation of at least one digital audiovisual content broadcast service, for example a digital content server, is located according to this example in the wide area network (WAN, 1) but it could indifferently be located in the local network (LAN, 10), for example in the domestic gateway 6 or any other piece of equipment capable of hosting such a content server. For example, the content server 2 receives digital TV content channels originating from a broadcast TV network, not represented, and/or videos-on-demand and/or digital TV contents available in rebroadcast in start over mode, and makes them available to the client terminals.

Recall that a local area network, also called in the following domestic network, is a computer network which connected together, with or without wires, the terminal piece of equipment, or more simply the terminals, of a home (computers, print, storage, peripherals, connected objects, etc.), able to communicate together. Such a domestic network may include a router piece of equipment, also commonly called gateway, an intermediate element ensuring the redirection, or routing, of the data packets between the different terminals and networks that are connected thereto. A user of such a network may execute a given service on a given terminal having its own characteristics (for example, view a multimedia content).

Without restriction, the multimedia content may be derived from a DVP, IP, etc., type network. Recall that a DVB (acronym for "Digital Video Broadcast") broadcast digital network has an underlying infrastructure possibly having as a support the satellite (SAT), the digital terrestrial television, or the cable, not represented. Alternatively or complementarily, the terminals could also be connected to a DVB-IP type network, also called IPTV, i.e. ensuring digital TV broadcasting or the supply of contents, for example in VOD (Video-On-Demand) from the Internet network under the control of a service operator ensuring the quality f the delivery (for example, the TV of an operator, associated to a digital decoder and a domestic gateway of the same operator). In both these cases, the multiplexed digital contents are received by a digital decoder, also called STB (or "Set Top Box"), via suitable reception media (antennas, cables, ADSL, etc.) and the different digital contents are demultiplexed and decoded before rendering via the terminals (for example, TV sets) connected to the decoder. Such a decoder, not represented in FIG. 1, may be associated to the gateway 6 or directly integrated into the terminal.

The terminal may also be intended to access contents continuously broadcast without download, or "streamed" from the WAN or from the LAN. In this case, we talk about "connected" TV set, i.e. the terminal could be connected to the Internet network in order to provide a set of services to the users. If rendering is not performed under the control of a service operator, we also talk in this case about OTT ("Over The Top") type contents. The OTT TV enables a user of a terminal connected to the Internet network to render digital channels or Web contents on the TV set. In general, this "connected" terminal type interfaces with the gateway in charge of the local area network of the user to access a content server in the wide area network. Finally, such a terminal may access digital contents from inside the local area network, for example for a streaming device associated to a local hard disk (not represented). In the following, we indifferently talk about multimedia content for contents received from a broadcast network (DBV, IPTV), in OTT, and/or via download (streaming, file download, etc.).

Figure 2:
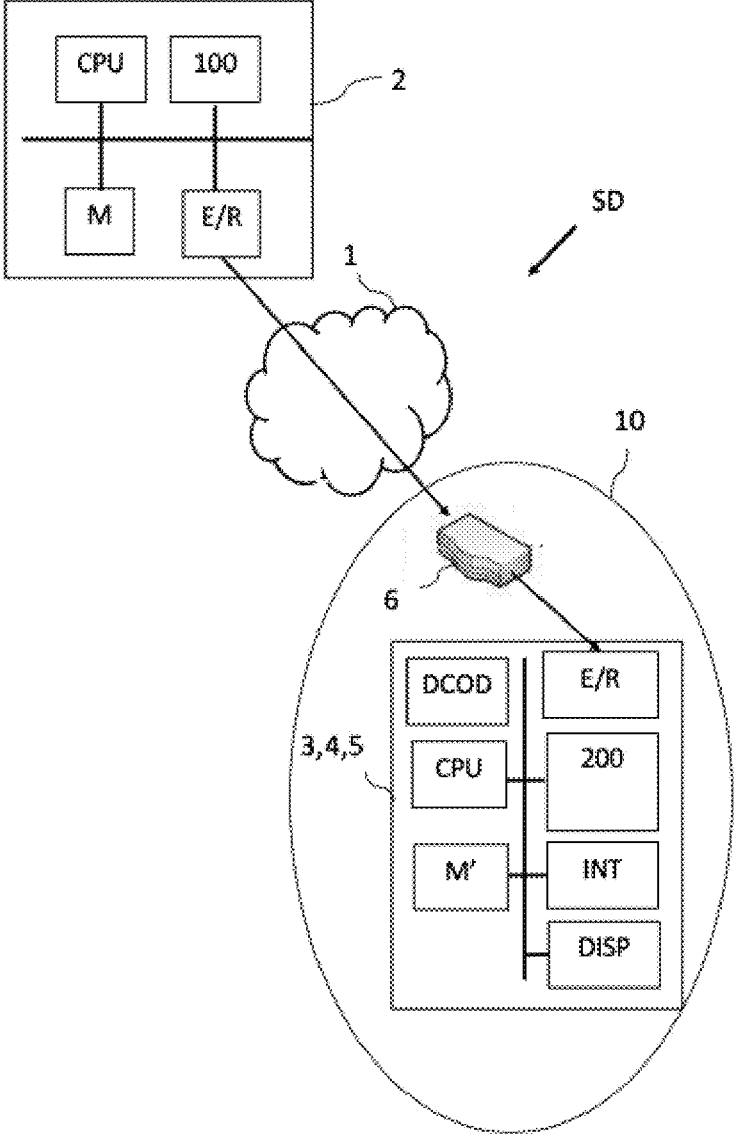
FIG. 2 schematically illustrates an example of an architecture of a device for generating a virtual TV channel and of a device for processing a request for accessing this virtual channel according to an embodiment of the development.

FIG. 2 represents an architecture of a service piece of equipment according to an embodiment of the development, for example a content server as described in FIG. 1.

Conventionally, it comprises memories M associated to a processor CPU. The memories may be of the ROM ("Read Only Memory") or RAM ("Random Access Memory") or Flash type. The service piece of equipment 2, also called in the following server piece of equipment 2, communicates with the wide area Internet network 1 and in particular with other service pieces of equipment (not represented) involved in the implementation of the considered digital content broadcast service(s). It also communicates with the client terminal 3, 4, 5 via the residential gateway 6 via an emission-reception E/R module.

According to this embodiment of the development, the server piece of equipment 2 comprises a device 100 for generating a virtual digital TV channel for the user of the client terminal 3, 4, 5. Such a generation device 100 is configured to:

obtain descriptive information, or metadata, associated to the content itself (for example: title, description, category, content type such as live or VOD, duration, video quality . . . );

select, based on the obtained descriptive information, amongst different types of audiovisual contents available for this user, an audiovisual content meeting one or more selection criterion/criteria; and upon reception of a request for accessing the customized TV channel originating from the user, transmit to the terminal of the user the selected audiovisual content, so it renders it to the user like a program of the customized channel.

In particular, the generation device 100 is configured to primarily select amongst a plurality of audiovisual contents being broadcast (i.e. audiovisual contents scheduled in a TV program schedule, also called in the following "scheduled audiovisual contents"), and accessible to the user, an audiovisual content scheduled in a TV program schedule, meeting the selection criterion/criteria. The "TV program" type contents may be "live" contents, i.e. contents retransmitted in live scheduled on a TV channel (for example a football match that takes place at the same time as the retransmission), or contents broadcast according to a scheduled time slot that the user watches at the time of broadcast over this time slot.

If no scheduled audiovisual content could be selected, then the device 100 is configured to launch a new audiovisual content search, this time amongst another plurality of audiovisual contents of different nature, comprising in particular scheduled audiovisual contents recorded and saved beforehand in a memory, for example in the memory M of the server piece of equipment 2.

Hence, the generation device 100 is also configured to record, at least periodically and possibly continuously, TV program type audiovisual contents meeting the selection criterion/criteria amongst a plurality of contents of this type. The scheduled audiovisual contents may be recorded for example in the memories M of the service piece of equipment 2 or in an external memory hosted by another equipment of the WAN telecommunications network 1. Alternatively, it is possible to record the scheduled audiovisual contents in a record space located in the "cloud" on a PVR ("Personal Video Recorder") type network.

This or these pre-recorded scheduled audiovisual content (s) is/are deleted from the memory when at least one delete condition is met, said at least one delete condition belonging to a group comprising:

a period of time has elapsed;

a storage capacity of the memory is reached;

the pre-recorded scheduled audiovisual content has been rendered by the terminal of the user as a program of the virtual TV channel.

Advantageously, the device 100 is configured to implement building by learning a model for analyzing and selecting the audiovisual contents accessible to the user according to the selection criterion/criteria. The application of this analysis and selection model by the generation device 100 then allows automatically selecting audiovisual contents likely to please the user based on selection criteria upon reception of a request for accessing the virtual channel.

This selection criterion may be a preference criterion of the user. In this case, the device 100 is configured to obtain preference criteria of the user. The preference criteria may be recorded for example in the memories M of the service piece of equipment 2 or in an external memory hosted by another equipment of the WAN telecommunications network 1.

Alternatively, this selection criterion may be a recurrent theme identified using descriptive information associated to the audiovisual contents accessible to the user. In this case, the device 100 is then configured to identify one or more recurrent theme(s), based on descriptive information of the accessible audiovisual contents of future TV program schedules.

Alternatively, the selection criterion may be both a preference criterion and a recurrent theme.

Thus, the device 100 implements the method for generating a virtual TV channel according to the development which will be detailed hereinafter in connection with FIGS. 3 and 4.

Alternatively, the device 100 may be independent of the service piece of equipment 2, but connected to the latter via any link, wired or not. For example, it is integrated to another piece of equipment of the wide area telecommunications network 1, for example another service piece of equipment. According to another embodiment of the development, it may be integrated into a piece of equipment of the LAN local area network 10, for example into the gateway 6, or a digital decoder ("Set Top Box"). According to this other embodiment, the memory in which the scheduled audiovisual contents are recorded may be a local memory of the LAN network 10, for example a hard disk, integrated or not into a piece of equipment of this local area network.

FIG. 2 also represents an architecture of a terminal piece of equipment 3, 4, 5 according to an embodiment of the development. For example, it consists of the TV set 5 of FIG. 1.

Conventionally, it comprises memories M' associated to a processor CPU. The memories may be of the ROM ("Read Only Memory") or RAM ("Random Access Memory") or Flash type. The terminal piece of equipment 3, 4, 5 communicates with the residential gateway 6 and accesses the wide area Internet network 1 via this gateway 6, which enables it in particular to communicate with service pieces of equipment such as the server 2, involved in the implementation of the considered audiovisual content broadcast service. The terminal piece of equipment 5 communicates with the LAN local area network 10 with other pieces of equipment of the local area network and in particular the gateway 6 via which it accesses the wide area Internet network 1 and in particular to the service piece of equipment 2 involved in the implementation of the considered audiovisual content broadcast service. Advantageously, it also comprises a module DCOD for decoding encoded data streams representative of an audiovisual content broadcast by the considered service and a module INT for interface with the user through which the latter in particular selects a TV channel or an audiovisual content. For example, it consists of a remote-control, a touchscreen, etc. Finally, it comprises a device DISP for displaying audiovisual contents, like for example the TV set 5 or a monitor.

According to this embodiment of the development, the terminal 3, 4, 5 comprises a device 200 for processing a request of the user for accessing the customized TV channel. In particular, such a device is configured to collect preference criteria of the user, when the selection criterion corresponds to the preference criteria, transmit them to the server piece of equipment 2, transmit to the server piece of equipment 2 the request for accessing the virtual TV channel originating from the user, receive the audiovisual content selected for the virtual channel and render to the user this selected audiovisual content, in response to said access request.

For example, the preference criteria of the user are input via the interface module INT. Once collected, they can be stored for example in the memories M' of the terminal piece of equipment 5 or in an external memory hosted by another piece of equipment of the LAN local area network 10.

Alternatively, the processing device 200 may be independent of the terminal piece of equipment 5, but connected to the latter via any link, wired or not. For example, it may be integrated into another terminal piece of equipment of the local area communication network, for example the domestic gateway 6.

Figure 3:
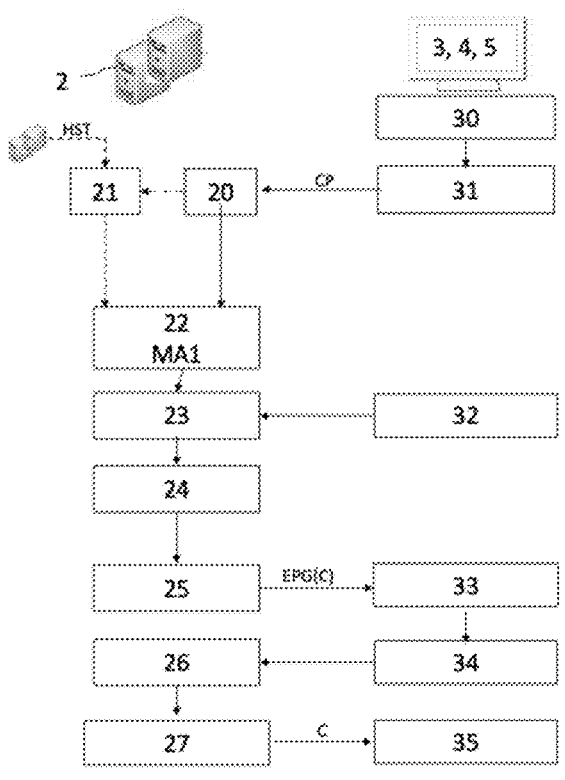
FIG. 3 describes in the form of a block diagram the steps of a method for generating a virtual TV channel, according to a first embodiment of the development.
Figure 4:
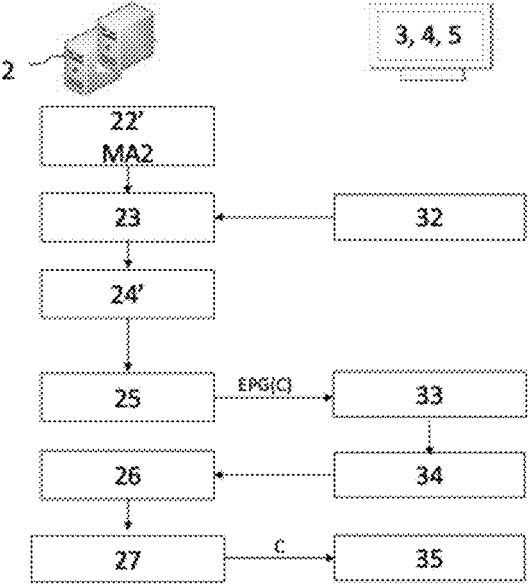
FIG. 4 describes in the form of a block diagram the steps of a method for generating a virtual TV channel, according to a second embodiment of the development.

Are now disclosed, with reference to FIGS. 3 and 4, in the form of block diagrams, examples of implementation of a method for generating a virtual TV channel for a user, according to embodiments of the development.

According to these embodiments, the audiovisual content broadcast by the virtual channel is selected according to one or more selection criterion/criteria upon request of the user. In other words, building the virtual channel is done after reception of a request for accessing said virtual channel by the user.

Furthermore, in the following, the generation method is implemented by the aforementioned device 100, integrated into a service piece of equipment 2, like for example a content server. Of course, the development is not limited to this embodiment, the device 100 being possibly integrated in a piece of equipment of the LAN local area network 10, like for example the gateway 6 or a digital decoder ("Set Top Box").

It is also assumed that the user of the terminal 5 accesses at least one audiovisual content broadcast service of a service operator, for example a TV channel live broadcast service 51. Optionally, it may also benefit from an access to a service S2 for broadcasting digital contents already broadcast in the start over mode and to a service S3 for video-on-demand rental, etc.

It should be noted that access to each of these services may be subject, or not, to prior subscription. In other words, the development applies to DTTV channels as well as to pay content broadcast services, for example via video-on-demand platforms.

It is also assumed that the server piece of equipment 2 participates in the implementation of these different services.

Referring to FIG. 3, a first embodiment of the development is described according to which the audiovisual content scheduled by the virtual channel is selected according to a selection criterion correspond to preference criteria of the user.

According to this embodiment, the user can define preferences enabling the device 100 of the server piece of equipment 2 to build a virtual channel broadcasting customized audiovisual contents. For example, these preferences may be:

contents relating to "Sports";

"Reportage" type contents;

"Series" type contents;

contents relating to "Music", etc.

Advantageously, these preference criteria comprise a plurality of characteristics of liked or preferred audiovisual contents of the user which he could then associate to a virtual channel. Hence, they define one or more theme(s) or subject(s), such as sports, travels, cinema, etc., a content type such as a film, a series, a documentary, a news broadcast, a film genre, like a comedy, a thriller, etc., with a violence or action level, with one or several actor(s) or presenter(s) intervening in the content, a time slot associated to a particular content type, etc.

For example, the preferences of the user are stored in a memory M of the server piece of equipment 2, associated to an identifier of the user.

In 30, the user terminal 5 obtains preference criteria from the user for the generation of his virtual TV channel.

According to a first embodiment, obtaining the preference criteria CP is done in a declarative way in an initial phase of configuring the preferences of the user for the creation of his virtual channel. For example, the terminal 5 presents a form to the user, comprising questions, that the user fills using the input interface INT, for example a touchscreen, a keyboard, a remote-control, etc.

In 31, the user terminal 5 transmits the obtained preference criteria CP to the server piece of equipment 2, which receives them in 20. It should be noted that the latter could have requested, or not, sending of this information CP by the terminal 5.

According to a second embodiment, in 21, the device 100 obtains a history HST of the habits or consumptions of the user on the different services provided by the operator. For example, it could be assumed that, for this purpose, it requires access to such data before another service piece of equipment of the operator, which manages a database dedicated to the storage of these histories of habits of the users.

The history HST groups together dated information on the audiovisual contents that the user has viewed or listened to, at least partially, from the terminal piece of equipment 5 or another terminal configured to access the services of the operator, over a past period of time. In particular, it consists of channel identifiers, program identifiers, possibly a number of views or a percentage of the viewed content, etc.

In the embodiment of FIG. 3, the method comprises in 22 building a model MA1 for analyzing and selecting contents based on the preference criteria CP obtained based on a declaration of the user and/or from a history HST. Indeed, the analysis of the content consumption history of the user could complete and enrich the preference criteria CP explicitly supplied by the user.

Building of this analysis and selection model MA1 is done, for example, by learning or training an automatic decision module of the device 100.

The analysis and selection model MA1 enables the device 100, in a phase of analyzing the descriptive information of the audiovisual contents accessible to the user, to select in 24, amongst audiovisual contents of different natures, and available for this user, at least one audiovisual content that corresponds to the preference criteria CP of the user.

It should be noted that the learning of the model MA1 and the analysis of the audiovisual contents using the model MA1 are herein disclosed in two steps, or in two distinct phases, for simplicity. However, it should be understood that the learning may be performed several times (in particular in parallel with or after the analysis) and that the analysis may be continuous.

In the analysis phase, the audiovisual contents available for the user are analyzed by the device 100, which is therefore configured to take a decision for each audiovisual content, for example by assigning thereto an index of compatibility with the preference criteria of the user, the value of this index increasing with the analyzed compatibility level.

In 32, the terminal 5 transmits to the server piece of equipment 2 a command for accessing the virtual channel. It is received in 23 and triggers the selection 24 of an audiovisual content amongst the audiovisual contents available for the user.

Thanks to the analysis model MA1, the device 100 selects amongst different audiovisual contents accessible to the user that one or those that correspond(s) to his preference criteria.

For this purpose, the device 100 searches in different sets of audiovisual contents a content that meets the selection criterion, in the present example, one or more preference criterion/criteria of the user. The different sets of audiovisual contents are hierarchized according to the nature of the audiovisual contents that composed them.

Indeed, the selection of an audiovisual content meeting the preference criteria of the user is primarily implemented amongst audiovisual contents being broadcast, or scheduled. Thus, as soon as the user requests access to his virtual channel, an audiovisual content being currently broadcast (i.e. broadcast according to a TV program schedule) meeting the preference criterion/criteria of the user is selected for rendering thereof.

In some cases, the terminal 5 could benefit from "Start Over" type functions enabling it to start the selected scheduled audiovisual content again from the beginning.

In the case where no scheduled audiovisual content meets the preference criterion/criteria of the user and therefore cannot be selected, the device 100 then searches in other sets of audiovisual contents. In particular, it favors a new selection amongst scheduled audiovisual contents recorded and saved beforehand in a memory, for example the memory M of the server piece of equipment 2.

Indeed, the device 100 continuously analyzes the descriptive information of the scheduled audiovisual contents in the TV program schedules in order to identify and select the audiovisual contents meeting the preference criterion/criteria of the user. If one or more of the scheduled audiovisual content(s) cannot be viewed in live by the user, then the device 100 proceeds with recording of the selected audiovisual content(s). This is the case for example when one or more content(s) is/are broadcast at late hours or when several contents meeting the preference criterion/criteria of the user are broadcast on the same time slot.

In other words, once the preferences of the user are defined and associated to a virtual channel, the device 100 records automatically, and according to the metadata associated to the scheduled audiovisual contents, contents corresponding to the defined preference criteria.

These audiovisual contents may be recorded for a limited duration (for example 30 days and then automatically erased) and/or within a given occupancy limit of the storage capacity of the memory of the equipment and/or after rendering of the considered content.

Thus, when the user accesses his virtual channel (by switching to the virtual channel), the device 100 checks whether there is in the streams of audiovisual contents being currently broadcast a content meets the preference criteria. If so, this scheduled content being broadcast is rendered to the user. If not, the device 100 then broadcasts the last recorded content that corresponds to the preference criteria. Once this content is read, it is automatically erased from the memory and the process is applied again.

If no scheduled or recorded content is available at the time when the user wishes to access his virtual channel, the device then searches in other sets of audiovisual contents available for the user, such as rebroadcast ("replay") type, or video-on-demand (VOD) contents.

It is assumed that an audiovisual content C has been selected. The EPG(C) information relating to this audiovisual content selected for the user, for example his identifier and, where appropriate, the identifier of the origin TV channel or of the service that provides it (resume or video-on-demand for example) are transmitted in 25 to the terminal 5 which receives them in 33. More generally, this information comprise all information necessary for the terminal 5 to be able to request access to the content C.

For example, the terminal 5 renders them to the user so he decides whether he wishes to view the scheduled content C or not.

It is assumed that the user confirms his choice of viewing this content C.

Using this information, the terminal 5 requests in 34 access to the content C, in a conventional manner, before the service that has initially suggested it. Upon reception of this request in 26, the server piece of equipment 2 transmits the content C to the terminal in 27, then the terminal 5 renders it to the user in 35 as if it were a program of his virtual channel.

For example, the user has defined a preference criterion "Sports/Foot" for the selection of audiovisual contents. A football match is broadcast in live on the BeIn1 channel starting at 8.30 PM, a football match is broadcast in live on the BeIn2 channel starting at 9.30 PM, and an audiovisual content meeting the criteria "Sports/Foot" has been recorded the day before on the TF1 channel.

Hence, when switching at 8.35 pm to the virtual channel, the scheduled content being broadcast best corresponding to his preference, i.e. "Sports/Foot" type content (in this case the match on BeIn1) is primarily suggested. At the end of the match, and without the user having to switch channels, the "Sports/Foot" content of the BeIn2 channel is automatically suggested to him. If the channel supports "Start Over", he is offered the possibility to view the match from the beginning, therefore with some delay, or to view the broadcast of the football match in live. At the end of the broadcast of the match broadcast in live, if no content being currently broadcast meets the "Sports/Foot" criterion, then an audiovisual content that has been broadcast the day before on TF1, but not viewed by the user (for example the football match has taken place during the office work hours of the user) and which has been recorded beforehand, is broadcast.

Referring to FIG. 4, a second embodiment of the development is described according to which the audiovisual content broadcast by the virtual channel is selected according to a recurrent theme identified based on the descriptive information of the audiovisual contents scheduled in a future TV program schedule.

In the embodiment of FIG. 4, the method therefore comprises in 22' building an analysis and selection model MA2 which analyzes, in an initial phase, the descriptive information, or metadata, of audiovisual contents accessible to the user: programs in future TV program schedules, available in "replay" or available in video-on-demand. This analysis and selection model MA2 then identifies during this initial phase recurrent themes, for example through the analysis of key words in the descriptive information of the audiovisual contents, in particular of the scheduled type contents. The identification of a theme is also done through the analysis of the descriptive information of "replay" type or video-on-demand type content.

For this purpose, the analysis and selection model MA2 uses in particular a predetermined occurrence criterion. This occurrence criterion is an integer comprised between 0 and N, corresponding to a number of times where the theme is found after analysis of the descriptive information. For example, a given number of times where key words appear in the descriptive information of the audiovisual contents. Thus, it is considered that starting from a given number or threshold of apparitions of the theme (for example, counted from a number of apparitions of key words identified beforehand as representative of the theme) in the descriptive information of the audiovisual contents, then it is considered that the theme is repeated on a regular basis and is therefore identified as recurrent. If, on the contrary, the number of apparitions of the theme is below this apparition threshold, it is then considered that the theme is not recurrent or is no longer recurrent because it tends to disappear from the descriptive information once the event has passed.

Afterwards, this analysis and selection model MA2 enables the device 100, in a phase of analyzing the descriptive information of the audiovisual contents accessible to the user, to select in 24', amongst a plurality of audiovisual contents available for this user, audiovisual contents that cover common themes.

It should be noted that the learning of the model MA2 and the analysis of the audiovisual contents using the model MA2 are herein disclosed in two steps, or in two distinct phases, for simplicity. However, it should be understood that the learning may be performed several times (in particular in parallel with or after the analysis) and that the analysis may be continuous.

Thus, following the identification of recurrent themes, the device 100, thanks to the analysis model MA2, searches amongst different sets of audiovisual contents (set of audiovisual contents being broadcast, recorded, rebroadcast, or video-on-demand) and selects amongst these different audiovisual contents accessible to the user, the audiovisual content(s) that correspond(s) to the identified recurrent themes. The selection is identical to that one described at step 24 described in connection with FIG. 3, except that the selection criterion in the example of FIG. 4 is a recurrent theme and not a preference criterion of the user. In other words, the device 100 starts by searching an audiovisual content meeting a recurrent theme amongst the scheduled contents, then if no scheduled audiovisual content could be selected, then it repeats its search this time amongst the pre-recorded scheduled audiovisual contents. If no scheduled or pre-recorded scheduled audiovisual content has been selected, then the device 100 searches a content to be selected amongst the audiovisual contents available in rebroadcast ("replay"), then, where necessary, amongst the audiovisual contents available as video-on-demand.

Steps 32, 23, 25 to 27, and 33 to 35 are unchanged.

Alternatively, the embodiments described in connection with FIG. 3 and in connection with FIG. 4 are combined, such as the selection criterion is both a preference criterion and a recurrent theme. The user can then benefit from a wide range of virtual channels which, according to the configuration selected by the user, are based on its preference criteria, recurrent themes or both.

Figure 5:
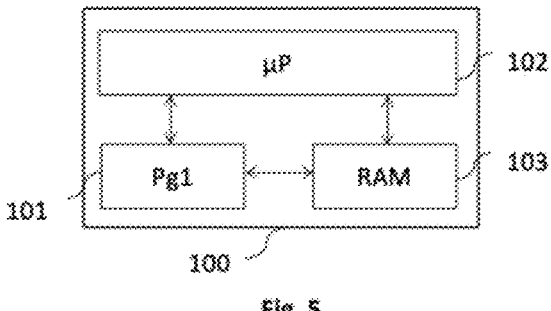
FIG. 5 describes an example of a hardware structure of a device for generating a virtual TV channel according to the development.

Referring to FIG. 5, an example of a hardware structure of a device 100 for generating a virtual TV channel for a user of a multimedia content access service is now disclosed. This generation device 100 is configured to obtain preference criteria of the user and/or identify recurrent themes, select, based on the selection criterion, an audiovisual content amongst different pluralities of audiovisual contents available for this user, receive a request for accessing the virtual channel originating from the user and make the selected audiovisual content available on the virtual TV channel.

More generally, such a device 100 comprises a random-access memory 103 (for example a RAM memory), a processing unit 102 equipped for example with a processor, and controlled by a computer program Pg1, representative of the obtainment, selection, reception and provision modules stored in a read-only memory 101 (for example a ROM memory or a hard disk). Upon initialization, the code instructions of the computer program are for example loaded in the read-access memory 103 before being executed by the processor of the processing unit 102. In one embodiment, the read-access memory 103 may also contain the preference criteria of the user, the recurrent themes and pre-recorded scheduled audiovisual contents.

FIG. 5 illustrates only a particular manner, amongst several possible ones, for making the device 100 so that it performs the steps of the method for generating the virtual TV channel for the user as detailed hereinabove, in connection with FIGS. 3 to 4, in its different embodiments. Indeed, these steps may be carried out indifferently on a reprogrammable computing machine (a PC computer, a DSP processor or a microcontroller) executing a program comprising an instruction sequence, or a dedicated computing machine (for example a set of logical gates like a FPGA or an ASIC, or any other hardware module).

In the case where the device 100 is made with a reprogrammable computing machine, the corresponding program (i.e. the instruction sequence) may be stored in a storage medium (such as a SD card, a flash disk, a CD-ROM or a DVD-ROM), removable or not, this storage medium is partially or totally readable by a computer or a processor.

The different embodiments have been described hereinbefore with regards to a device 100 integrated into a server piece of equipment 2 of a telecommunications network WAN 1 of an operator, but it may also be integrated into a domestic or professional gateway 6 for accessing this WAN network 1 and configured to manage a local area network LAN 10 to which the terminal piece(s) of equipment 3, 4, 5 of the user connect(s), or else in a digital decoder.

Figure 6:
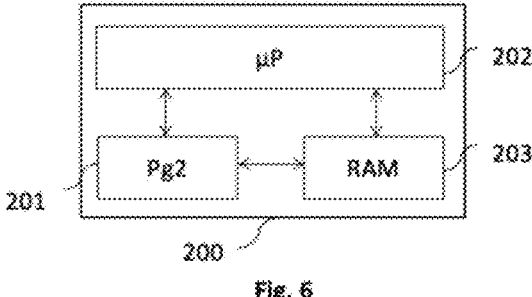
FIG. 6 describes an example of a hardware structure of a device for processing a request for accessing this virtual channel according to the development.

Referring to FIG. 6, an example of a hardware structure of a device 200 for processing a request for accessing a virtual TV channel for a user of an audiovisual content access service is also disclosed. In particular, this device 200 is configured to transmit, where appropriate, to a service piece of equipment involved in the implementation of the service of preference criteria of the user, transmit to the service piece of equipment a request for accessing the virtual TV channel originating from the user and render to the user the selected audiovisual content for the virtual TV channel.

More generally, such a device 200 comprises a read-access memory 203 (for example a RAM memory), a processing unit 202 equipped for example with a processor, and controlled by a computer program Pg2, representative of the obtainment and transmission modules, stored in a read-only memory 201 (for example a ROM memory or a hard disk). Upon initialization, the code instructions of the computer program are for example loaded in the read-access memory 203 before being executed by the processor of the processing unit 202. The read-access memory 203 may also contain the preference criteria obtained from the user.

FIG. 6 illustrates only a particular manner, amongst several possible ones, for making the device 200 so that it processes a request of the user for accessing a virtual channel generated by the method according to the development according to the development as detailed hereinabove, in connection with FIGS. 3 and 4 and in its different embodiments. Indeed, this processing may be carried out indifferently on a reprogrammable computing machine (a PC computer, a DSP processor or a microcontroller) executing a program comprising an instruction sequence, or on a dedicated computing machine (for example a set of logical gates such as a FPGA or an ASIC, or any other hardware module).

In the case where the device 200 is made with a reprogrammable computing machine, the corresponding program (i.e. the instruction sequence) may be stored in a storage medium (such as a SD card, a flash disk, a CD-ROM or a DVD-ROM), removable or not, this storage medium is partially or totally readable by a computer or a processor.

The development that has just been described in its different embodiments has many advantages. By selecting, for one user, the best audiovisual content amongst a plurality of available audiovisual contents, it generates for this user a virtual TV channel, based on his preferences and/or recurrent themes.

All the user needs to do is to select his virtual TV channel to directly access audiovisual contents selected for him, without effort and without any tedious search.

The development further proposes continuously recording audiovisual contents according to the preference criteria of the user and/or recurrent themes so as to be able to effectively feed in the virtual channel at any time with suitable audiovisual contents.

The invention claimed is:

1. A method for transmitting a selected content of a TV channel accessible from a terminal configured to access at least one audiovisual content broadcast service, audiovisual contents including contents being broadcast, the method comprising:

selecting an audiovisual content according to at least one selection criterion and descriptive information associated to the audiovisual contents, the selected audiovisual content being selected as a priority among contents being broadcast, wherein the selected audiovisual content is an audiovisual content currently being broadcast if such audiovisual content corresponding to at least one selection criterion and descriptive information criterion associated to the audiovisual contents is available at a time when the selection is made; and adding the selected content to the TV channel;

wherein the method further comprises:

when no audiovisual content being broadcast is selected, selecting, amongst a plurality of audiovisual contents, and accessible from the terminal of the user via the at least one service, at least one other audiovisual content, according to the at least one selection criterion and descriptive information associated to the audiovisual contents;

upon reception of a request for accessing the virtual TV channel originating from the terminal of the user, transmitting, for rendering thereof by the terminal of the user as a program of the virtual channel:

(i) the selected audiovisual content, if it is being broadcast; and (ii) the at least one other audiovisual content, otherwise;

wherein the method further comprises:

recording the selected audiovisual content being broadcast, referred to as pre-recorded broadcast audiovisual content, in a memory and in that the at least one other plurality of audiovisual contents comprises the pre-recorded broadcast audiovisual content; and transmitting the selected content to a terminal for rendering thereof on a screen of the terminal;

wherein at least one other plurality of audiovisual contents amongst which the selection of the at least one other audiovisual content is implemented further comprises:

audiovisual contents available in rebroadcast, if no audiovisual content being broadcast and no pre-recorded broadcast audiovisual content could be selected; and audiovisual contents accessible on demand, if no audiovisual content available in rebroadcast could be selected.

2. The transmitting method according to claim 1, wherein the method further comprises obtaining at least one preference criterion of the user, and the at least one selection criterion comprises the at least one preference criterion of the user.

3. The transmitting method according to claim 1, wherein the method comprises determining at least one so-called recurrent theme, based on descriptive information of audiovisual contents scheduled in at least one TV program schedule over a given period of time and on a predetermined occurrence criterion and the at least one selection criterion comprises the recurrent theme.

4. The transmitting method according to claim 1, wherein the pre-recorded broadcast audiovisual content is deleted from the memory when at least one delete condition is met, the at least one delete condition belonging to a group comprising:

a period of time has elapsed;

a storage capacity of the memory is reached; and the pre-recorded broadcast audiovisual content has been rendered by the terminal of the user as a program of the virtual TV channel.

5. A device for transmitting a selected content of a TV channel accessible from a terminal configured to access at least one audiovisual content broadcast service, audiovisual contents including contents being broadcast, the device being configured to:

select an audiovisual content according to at least one selection criterion and descriptive information associated to the audiovisual contents, the selected audiovisual content being selected as a priority among contents being broadcast, wherein the selected audiovisual content is an audiovisual content currently being broadcast if such audiovisual content corresponding to at least one selection criterion and descriptive information criterion associated to the audiovisual contents is available at a time when the selection is made;

add the selected content to the TV channel; and transmit the selected content to a terminal for rendering thereof on a screen of the terminal;

wherein at least one other plurality of audiovisual contents amongst which the selection of the at least one other audiovisual content is implemented further comprises:

audiovisual contents available in rebroadcast, if no audiovisual content being broadcast and no pre-recorded broadcast audiovisual content could be selected; and audiovisual contents accessible on demand, if no audiovisual content available in rebroadcast could be selected.

6. The transmitting device according to claim 5, wherein the generation device is further configured:

when no audiovisual content being broadcasted is selected, to select, amongst at least one other plurality of audiovisual contents accessible from the terminal of the user by the at least one service, at least one other audiovisual content, according to the at least one selection criterion and descriptive information associated to the audiovisual contents; and upon reception of a request for accessing the virtual TV channel originating from the terminal of the user, to transmit for rendering thereof by the terminal of the user as a program of the virtual channel:

(i) the selected audiovisual content, if it is being broadcast; and (ii) the at least one other audiovisual content, otherwise.

7. The transmitting device according to claim 5, wherein the generation device is further configured to record the selected audiovisual content being broadcast, referred to as pre-recorded broadcast audiovisual content, in a memory and in that the at least one other plurality of audiovisual contents comprises the pre-recorded broadcast audiovisual content.

8. The transmitting device according to claim 5, wherein the generation device is configured to obtain at least one preference criterion of the user, and the at least one selection criterion comprises the at least one preference criterion of the user.

9. The transmitting device according to claim 5, wherein the generation device is configured to determine at least one so-called recurrent theme, based on descriptive information of audiovisual contents scheduled in at least one TV program schedule over a given period of time and on a predetermined occurrence criterion and the at least one selection criterion comprises the recurrent theme.

10. A service piece of equipment involved in the implementation of at least one service for broadcasting audiovisual contents to a user, the service piece of equipment comprising a device for transmitting a selected content of a virtual TV channel for the user according to claim 5.

11. A non-transitory computer-readable storage medium on which a computer program is stored comprising program code instructions for the execution of the method according to claim 1.

12. A processing circuit comprising a processor and a memory, the memory storing program code instructions of a computer program for executing the method according to claim 1, when the computer program is executed by the processor.

13. The transmitting method according to claim 1, further comprising broadcasting the selected content.

14. The transmitting device according to claim 5, wherein the device is further configured to broadcast the selected content.

* * * * *